(12) United States Patent
Fujita et al.

(10) Patent No.: US 8,094,261 B2
(45) Date of Patent: Jan. 10, 2012

(54) DISPLAY UNIT AND PROCESSING SYSTEM EACH HAVING A WIRING BOARD IN SUBSTANTIALLY THE SAME PLANE AS A LIQUID CRYSTAL MODULE

(75) Inventors: Kiyohito Fujita, Kanagawa (JP); Ryosuke Tobiyama, Tokyo (JP); Nobuyuki Shigeno, Tokyo (JP); Makoto Tanahashi, Kanagawa (JP); Osamu Koyama, Tokyo (JP)

(73) Assignee: Sony Corporation, Tokyo (JP)

( * ) Notice: Subject to any disclaimer, the term of this patent is extended or adjusted under 35 U.S.C. 154(b) by 284 days.

(21) Appl. No.: 11/464,876

(22) Filed: Aug. 16, 2006

(65) Prior Publication Data

US 2007/0046851 A1    Mar. 1, 2007

(30) Foreign Application Priority Data

Aug. 30, 2005   (JP) .............................. P2005-249347

(51) Int. Cl.
   *G02F 1/1335*    (2006.01)
(52) U.S. Cl. ............. 349/65; 349/58; 362/612; 362/631
(58) Field of Classification Search ..................... 349/58, 349/65; 362/612, 631
   See application file for complete search history.

(56) References Cited

U.S. PATENT DOCUMENTS

| 6,593,979 | B1 * | 7/2003 | Ha et al. ........................... | 349/58 |
| 7,083,318 | B2 * | 8/2006 | Ha et al. .......................... | 362/633 |
| 7,436,467 | B2 * | 10/2008 | Lee .................................. | 349/59 |
| 2004/0212756 | A1 * | 10/2004 | Fukayama et al. ............... | 349/58 |

FOREIGN PATENT DOCUMENTS

| JP | 1999-337937 | 12/1999 |
| JP | 2003-295789 | 10/2003 |
| JP | 2004-094256 | 3/2004 |
| JP | 2004-170503 | 6/2004 |
| JP | 2004-333670 | 11/2004 |
| JP | 2005-024751 | 1/2005 |

OTHER PUBLICATIONS

Japanese Office Action for JP Application No. 2005-249347 filed on Mar. 22, 2010.

* cited by examiner

*Primary Examiner* — Richard Kim
(74) *Attorney, Agent, or Firm* — SNR Denton US LLP

(57) ABSTRACT

Disclosed are a display unit and a data processing system equipped therewith. The display unit includes a liquid crystal module, a rear panel covering the back surface of the liquid crystal module, a front periphery covering member covering a peripheral part of the front surface of the liquid crystal module, and a wiring board for driving the liquid crystal module. The liquid crystal module includes a liquid crystal cell, a light guide panel disposed behind the back surface of the liquid crystal cell, a reflecting panel disposed behind the back surface of the light guide panel, plural LEDs disposed opposite to one end surface of the light guide panel, and a holding frame provided with a spacing part, covering a peripheral part of the back surface of the reflecting panel and holding the liquid crystal cell, the light guide panel, the reflecting panel and the LEDs. The wiring board and the liquid crystal module are contained substantially in a plane in a space between the rear panel and the front periphery covering member.

7 Claims, 15 Drawing Sheets

DISPLAY UNIT AND PROCESSING SYSTEM EACH HAVING A WIRING BOARD IN SUBSTANTIALLY THE SAME PLANE AS A LIQUID CRYSTAL MODULE

CROSS REFERENCES TO RELATED APPLICATIONS

The present invention contains subject matter related to Japanese Patent Application JP 2005-249347 filed in the Japanese Patent Office on Aug. 30, 2005, the entire contents of which being incorporated herein by reference.

BACKGROUND OF THE INVENTION

1. Field of the Invention

The present invention relates to a newly developed display unit and a data processing system. More specifically, the present invention relates to a thin display unit and a data processing system provided with the display unit.

2. Description of the Related Art

It is desired to build a small, lightweight data processing system mostly carried around and used at places away from the home office, such as a small, lightweight personal computer generally called a mobile personal computer, in the thinnest possible structure to facilitate carrying the data processing system around in a briefcase.

When a liquid crystal cell is used as display means, a wiring board is needed to drive the liquid crystal cell and a backlight unit. A wiring harness connecting the liquid crystal cell and the back light unit to the wiring board and connecting the wiring board to an external circuit or a power supply is extended in a narrow space between a liquid crystal module and a rear cell. Such a layout of those components is illustrated in, of example, Japanese Patent Laid-Open Publication No. 2005-24751 (FIGS. 2 and 5).

SUMMARY OF THE INVENTION

A thin display unit employing a liquid crystal cell has a low torsional rigidity and a low flexural rigidity. If a wiring board and a wiring harness are disposed in a space between a liquid crystal module and a rear panel, the wiring board and the harness are pressed against the back surface of the liquid crystal module when the rear panel is twisted or bent or if a foreign body collides against the back surface of the back panel. Consequently, the liquid crystal cell susceptible to pressure malfunctions and pixels in a pressed part are damaged if things come to the worst.

In view of the foregoing problem, it is desirable to provide a display unit employing a liquid crystal cell and not having any parts placed in a space between a liquid crystal module and a rear panel.

In a first embodiment according to the present invention, there is provided a display unit including: a liquid crystal module; a rear panel covering the back surface of the liquid crystal module; a front periphery covering member covering a peripheral part of the front surface of the liquid crystal module; and a wiring board for driving the liquid crystal module, wherein: the liquid crystal module includes a liquid crystal cell, a light guide panel disposed behind the back surface of the liquid crystal cell, a reflecting panel disposed behind the back surface of the light guide panel, plural light emitting diodes (hereinafter, abbreviated to "LEDs") disposed opposite to one end surface of the light guide panel, and a holding frame provided with a spacing part, covering a peripheral part of the back surface of the reflecting panel and holding the liquid crystal cell, the light guide panel, the reflecting panel and the LEDs; and the wiring board and the liquid crystal module are contained substantially in the same plane in a space between the rear panel and the front periphery covering member.

Therefore, in the display unit of the first embodiment, the wiring board is not disposed in the space between the liquid crystal module and the rear panel; accordingly, a sufficiently thick space can be formed between the liquid crystal module and the rear panel even if the display unit is formed in the least possible thickness. Consequently, the possibility of the rear panel coming into contact with the liquid crystal module when the rear panel is warped or bent is reduced.

In the display unit of the first embodiment, forwardly protruding steps may be formed at least in part of the front surface of a back wall of the rear panel extending along opposite side edges, and at least part of the spacing part of the holding frame of the liquid crystal module extending along the opposite side edges may be in contact with the forwardly protruding steps to form a space of a thickness equal to the sum of the height of the step from the back wall and the thickness of the spacing part of the holding frame. Therefore, the space of a sufficient thickness can be formed between the back wall of the rear panel and the reflecting panel by using the holding frame necessary for assembling the liquid crystal module.

In the display unit of the first embodiment, positioning walls in contact with four corner parts of the liquid crystal module to position the liquid crystal module with respect to directions in a plane may be formed at least in four corner parts of the back wall of the rear panel, and the wiring board may be attached to the holding frame. Therefore, the liquid crystal module can be accurately positioned on the rear panel, and the wiring board will not be affected by the warping or bending of the rear panel and will not be damaged even if the rear panel is warped or bent because the wiring board is separated from the rear panel.

In the display unit of the first embodiment, a wiring harness for connecting the wiring board to an external device may be extended beside the liquid crystal module. Therefore, the space between the rear panel and the liquid crystal module will not be narrowed by the wiring harness.

In the display unit of the first embodiment, a connecting part formed in the rear panel may be fastened to hinges disposed in front of the connecting part with screws. Therefore, the screws fastening the display unit to the hinges will not obstruct forming the display unit in a small thickness.

In a second embodiment according to the present invention, there is provided a data processing system provided with a display unit including: a liquid crystal module; a rear panel covering the back surface of the liquid crystal module; a front perimeter covering member for covering a peripheral part of the front surface of the liquid crystal module; and a wiring board for driving the liquid crystal module, wherein: the liquid crystal module includes a liquid crystal cell, a light guide panel disposed behind the back surface of the liquid crystal cell, a reflecting panel disposed behind the back surface of the light guide panel, plural light emitting diodes (hereinafter, referred to as "LEDs") disposed opposite to one end surface of the light guide panel, and a holding frame provided with a spacing part covering a peripheral part of the back surface of the reflecting panel and holding the liquid crystal cell, the light guide panel, the reflecting panel and the LEDs; and the wiring board and the liquid crystal module are contained substantially in the same plane in a space between the rear panel and the front perimeter covering member.

Therefore, in the data processing system of the second embodiment, the wiring board is not disposed in the space between the liquid crystal module and the rear panel; accordingly, a sufficiently thick space can be formed between the liquid crystal module and the rear panel even if the display unit is formed in the least possible thickness. Consequently, the possibility of the rear panel coming into contact with the liquid crystal module when the rear panel is warped or bent is reduced.

BRIEF DESCRIPTION OF THE DRAWINGS

Embodiments of the present invention will be described in detail based on the following figures, wherein.

DESCRIPTION OF THE PREFERRED EMBODIMENTS

A display unit in a preferred embodiment according to the present invention and a data processing system in a preferred embodiment according to the present invention will be described.

Figure 1:
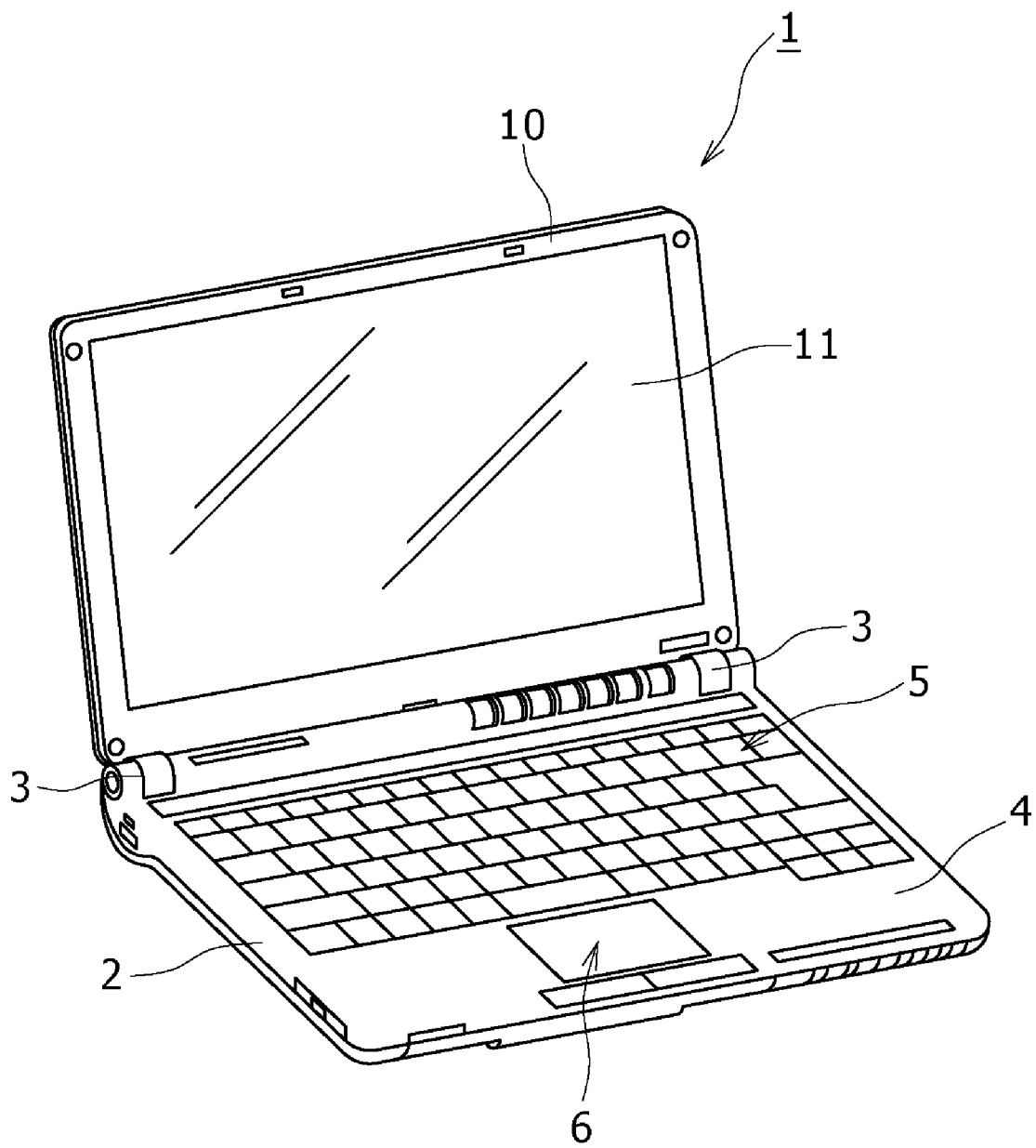
FIG. 1 is a schematic perspective view of a data processing system in a preferred embodiment according to the present invention.

FIG. 1 shows a notebook-sized personal computer 1 (hereinafter referred to simply as "personal computer 1"), namely, a data processing system, in a preferred embodiment according to the present invention.

The personal computer 1 includes a main unit 2 and a display unit 10 connected to the main unit 2 by hinges 3. The main unit 2 has a main case 4. Contained in the main case 4 are wiring boards including a main wiring board provided with a CPU (central processing unit), storage devices, an image processing unit, a data processing unit and other circuits, and a recording device including a DVD drive (digital versatile disk drive) and memory card slots. A keyboard unit 5, a pointing device 6 and the like are arranged on the top wall of the main case 4. A disk tray slot, not shown, through which a disk tray included in the DVD drive moves, a USB connector (universal serial bus connector), not shown, an IEEE (Institute of Electrical and Electronics Engineer) 1394 connector, not shown, and a light receiving device, not shown, serving as an interface for optical communication are disposed on the side walls of the main case 4.

The display unit 10 is connected to the main unit 2 by the hinges 3 so as to turn on the hinges 3 relative to the main unit 2 between a closed position where the display unit 10 covers the upper surface of the main unit 2 and an open position shown in FIG. 1.

The display unit 10 will be described.

Figure 2:
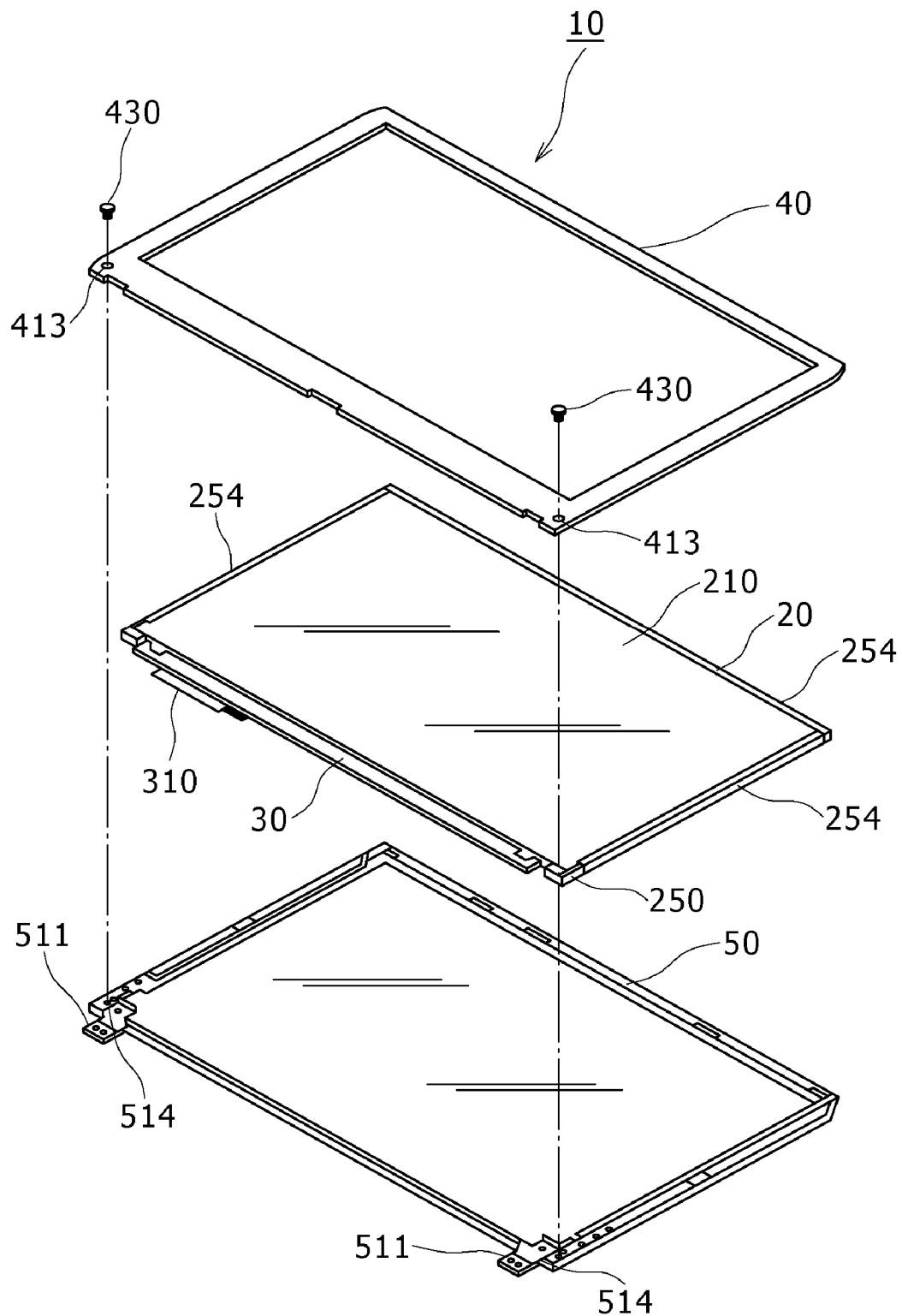
FIG. 2 is a schematic, exploded perspective view of a display unit.

Referring to FIG. 2, the display unit 10 includes a liquid crystal module 20, a wiring board 30, a front periphery covering member 40 and a rear panel 50. The liquid crystal module 20 and the wiring board 30 are held in a shell formed by combining the front periphery covering member 40 and the rear panel 50.

Figure 3:
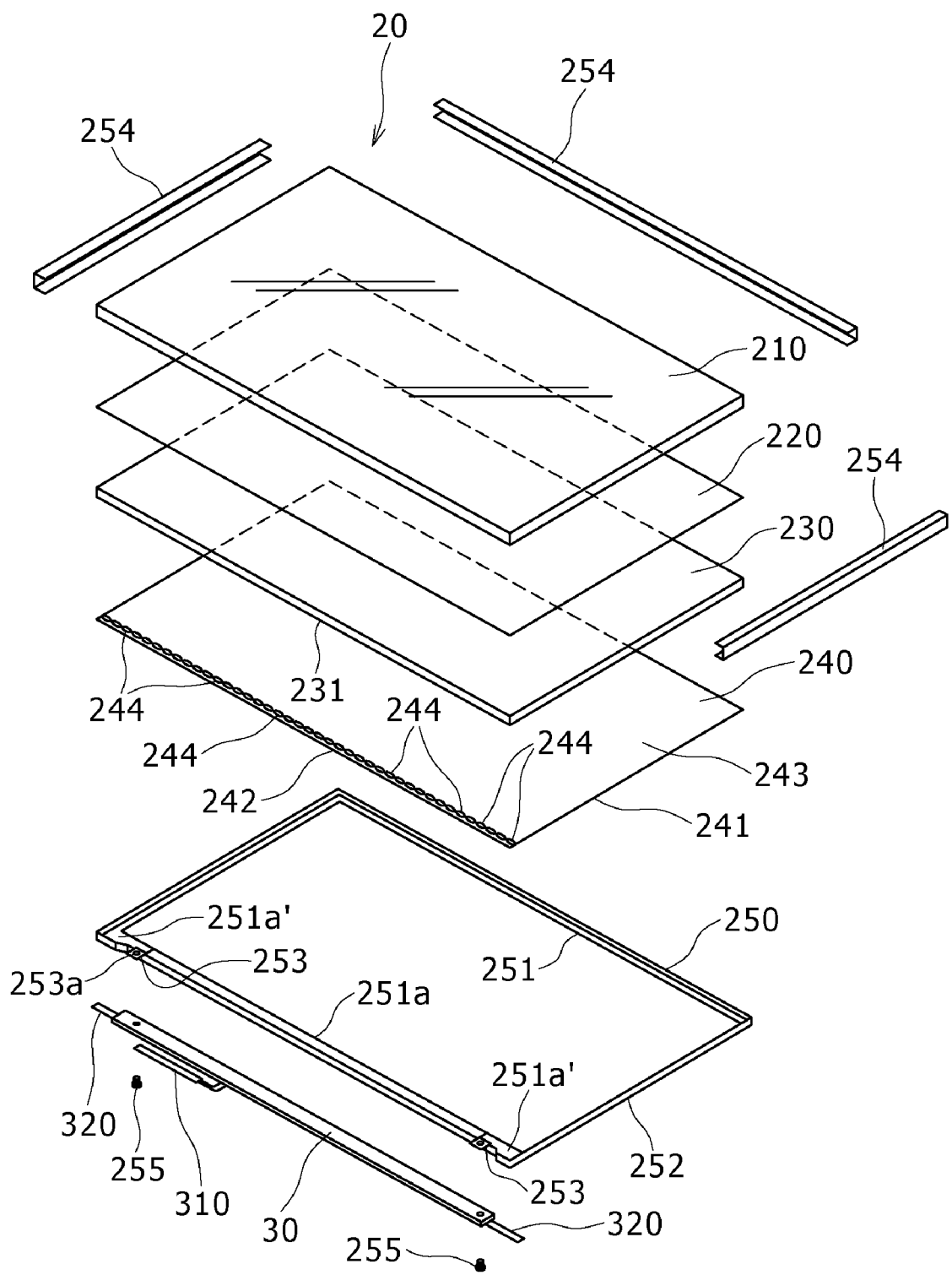
FIG. 3 is a schematic, exploded perspective view of a liquid crystal module.
Figure 4:
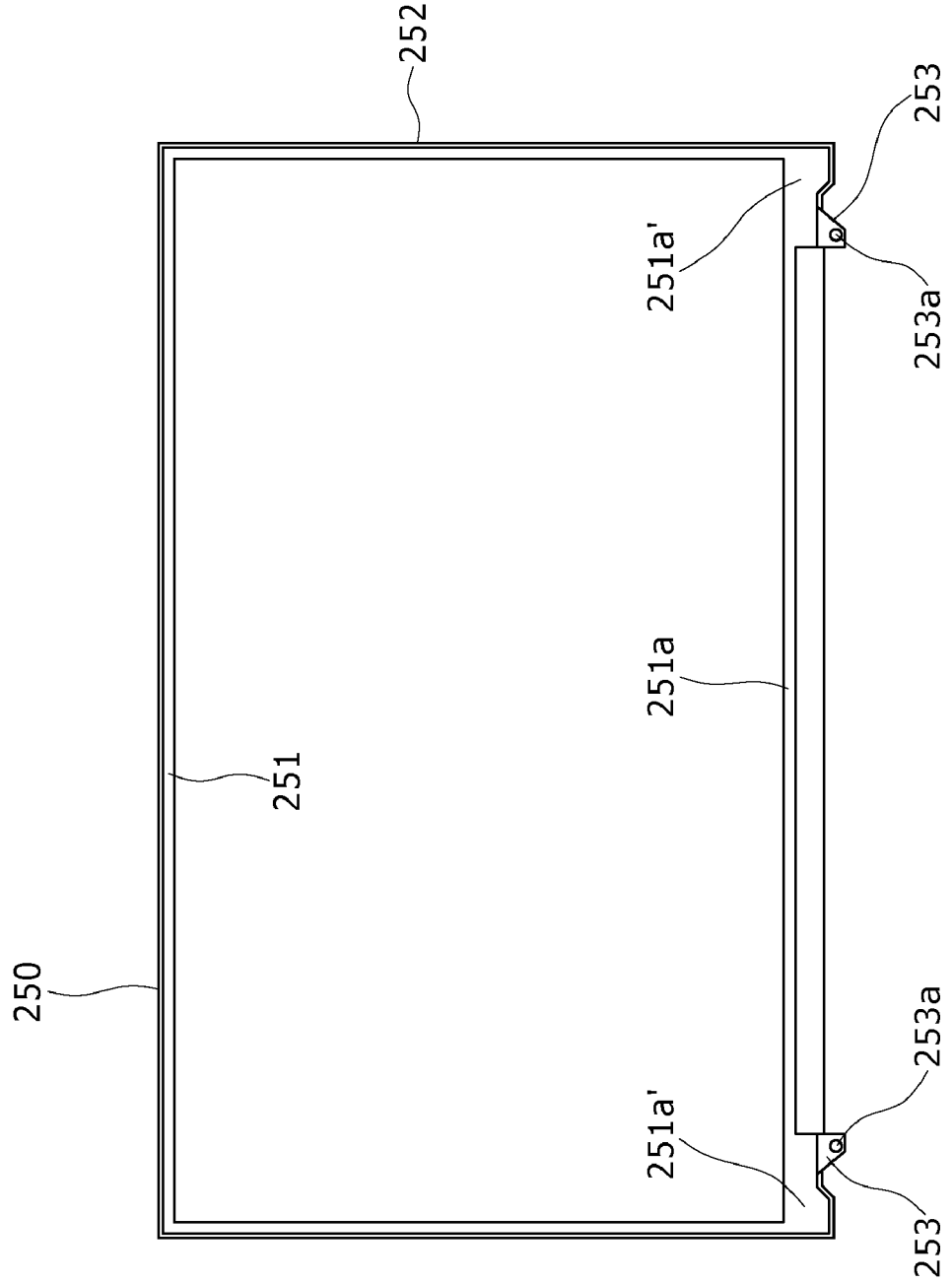
FIG. 4 is a front elevation of a holding frame.

Referring to FIG. 3, the liquid crystal module 20 is built by holding a stacked structure formed by superposing a liquid crystal cell 210, a prism sheet 220, a light guide panel 230 and a reflecting panel 240 in that order from the front side backward in a holding frame 250. The prism sheet 220, the light guide panel 230 and the reflecting panel 240 are substantially the same in shape and size in a plane.

The prism sheet 220 is a thin, transparent sheet having a back surface provided with countless prismatic protrusions having the shape of a prism. The prismatic protrusions have a triangular cross section having a vertex of an angle between about 20° and about 180°. The prismatic protrusions are arranged over the entire back surface of the transparent sheet at pitches in the range of about 10 µm to about 1 mm. Light fallen on the back surface of the prism sheet 220 is reflected in an internal reflection mode by the facets of the prismatic protrusions so as to travel forward in a direction substantially perpendicular to the exit surface of the prism sheet.

The light guide panel 230 is a thin, transparent sheet provided with minute irregularities in the back surface thereof. Light entered the light guide panel 230 through one end surface of the light guide panel 230 is spread over the entire light guide panel 230 by internal reflection and is reflected by the minute irregularities formed in the back surface of the light guide panel 230 so as to travel forward. Means for reflecting the light so as to travel forward are not limited to the minute irregularities and may be minute irregularities formed in the exit surface of the light guide panel 230. When light enters a light guide panel through one end surface of the light guide panel, light leaves the light guide panel earlier from parts nearer to the entrance end surface of the exit surface and leaves later from parts farther from the entrance end surface of the exit surface of the light guide panel. Therefore, in some cases, the intensity of light leaving parts farther from the entrance end surface of the exit surface of the light guide panel is insufficient. Light intensity distribution on the entire exit surface of the light guide panel 230 can be leveled off by forming the minute irregularities in lower densities in parts nearer to the entrance end surface of the exit surface and in higher densities in parts farther from the entrance end surface of the exit surface. The height of the light guide panel 230 is slightly smaller than that of the reflecting panel 240.

The reflecting panel 240 is formed by attaching a reflecting film 243 to the front surface of an electrically insulating thin plate 241 so as to cover most part of the front surface excluding a laterally elongate light-emitter holding part extending along the lower edge of the thin plate 241. The reflecting film 243 is formed by a suitable means, such as a vacuum evaporation process or anion plating process. Many LEDs 244 are arranged on a light-emitter holding part 242 of the front surface of the thin plate 241. Wiring lines, not shown, are formed in the light-emitter holding part 242 to connect the LEDs 244 to a lighting circuit. The wiring lines and the reflecting film 243 may be simultaneously formed by using a mask or the like.

When the reflecting panel 240 is brought into contact with the back surface of the light guide panel 230, the LEDs 244 arranged on n the light-emitter holding part 242 are disposed opposite to the lower end surface 231, namely, an entrance end surface, of the light guide panel 230. Thus light emitted by the LEDs 244 travels through the entrance end surface 231 of the light guide panel 230 into the light guide panel 230, spreads all over the light guide panel 230, travels forward from the light guide panel 230 and fall on the prism sheet 220. The prism sheet 220 deflects the light so that the light may fall on the liquid crystal cell 210 substantially perpendicularly to the front surface of the liquid crystal cell 210. Thus the light emitted by the LEDs 244 serves efficiently as back light for illuminating the liquid crystal cell 210. Part of the light emitted by the LEDs 244 outgoing through the back surface of the light guide panel 230 is reflected by the reflecting film 243 of the reflecting panel 240 toward the light guide panel 230. Thus all the light incident on the light guide panel 230 is used effectively as back light.

Thus the LEDs 244 are disposed on a part of the reflecting panel 240 instead of individually mounting the LEDs 244 on wiring boards. Thus the liquid crystal module 20 has a small number of component parts and the LEDs 244 can be easily positioned relative to the entrance end surface 231.

The holding frame 250 is formed by bending a thin metal sheet. The holding frame 250 has a backing member 251 having the shape of a rectangular frame. The backing member 251 serves also as a spacer. A lower part 251a of the backing member 251 has a width greater than those of other parts of the backing member 251. Opposite end parts 251a' of the lower part 251a protrude slightly downward. Side walls 252 are formed along the outer edges of the upper part, side parts and opposite end parts 251a' of the lower part of the backing member 251. Wiring board holding lugs 253 project downward from parts, near the end parts 251a', of the lower part 251a of the backing member 251. Threaded holes 253a are formed in the wiring board holding lugs 253, respectively.

A stacked structure formed by superposing the liquid crystal cell 210, the prism sheet 220, the light guide panel 230 and the reflecting panel 240 is mounted on the front surface of the backing member 251 of the holding frame 250. In this state, the side walls 252 of the holding frame 250 are in contact with the upper the right side surfaces and the left side surfaces of the superposed liquid crystal cell 210, prism sheet 220, light guide panel 230 and reflecting panel 240. Upper, right and left edge parts of the back surface of the reflecting panel 240 may be bonded to the holding frame 250 with adhesive tapes or the like. After mounting the stacked structure formed by superposing the liquid crystal cell 210, the prism sheet 220, the light guide panel 230 and the reflecting panel 240 has been mounted on the holding frame 250, adhesive tapes 254 are attached to upper, right and left parts of the back surface of the backing member 251 of the holding frame 250, the outer surfaces of the sidewalls 252 and the front surface of the liquid crystal cell 210. That is, adhesive tapes 254 are formed in the shapes of a trough having a U-shaped cross section and side walls of the thus shapes adhesive tapes 254 are attached to edge parts of the back surface of the holding frame 250 and the front surface of the liquid crystal cell 210.

The liquid crystal module 20 is thus constructed. The prism sheet 220 deflects light emerging from the light guide panel 230 in a direction facilitating the transmission of the light through the liquid crystal cell 210 to enhance the efficiency of the back light sources. However, the prism sheet 220 is not an essential component of the liquid crystal module 20 and may be omitted.

Figure 5:
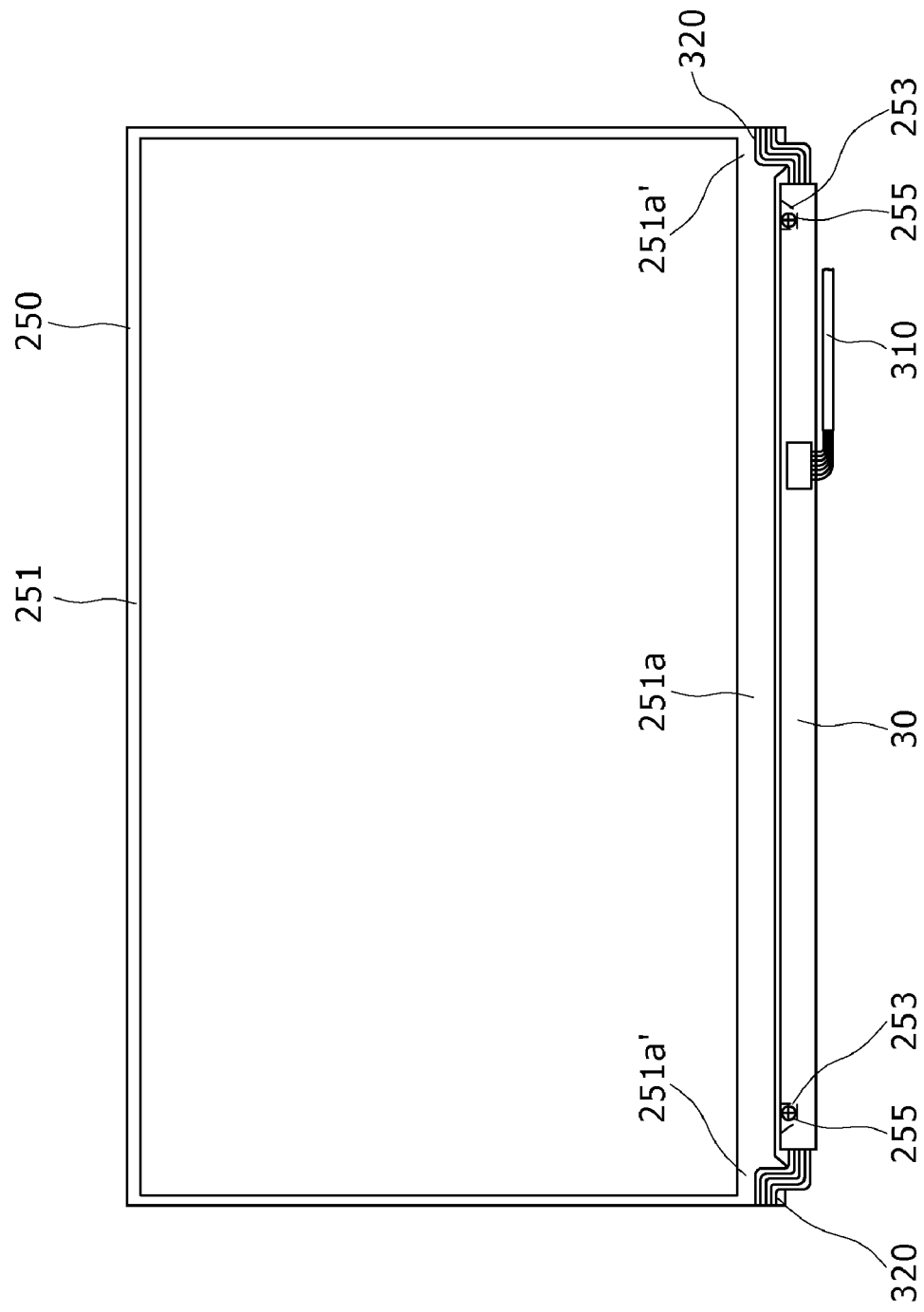
FIG. 5 is a schematic rear view of the holding member holding a wiring board.

The wiring board 30 has the shape of a band and is provided with a drive circuit for driving the liquid crystal cell 210 and a lighting circuit for lighting the LEDs 244. The wiring board 30 is provided with through holes, not shown, in opposite end parts thereof. The wiring board 30 is attached to the holding frame 250 by placing the wiring board 30 on the wiring board holding lugs 253 and inserting screws 255 in the through holes of the wiring board 30 and screwing the screws 255 into the threaded holes 253a of the wiring board holding lugs 253 as shown in FIG. 5. The wiring board 30 and the liquid crystal module 20 are contained in substantially the same plane. A wiring harness 310 for connecting the wiring board 30 to an external circuit, namely, a circuit included in the main unit 2 of the personal computer 1, and flexible cables 320 connected to the liquid crystal cell 210 and the LEDs 244 are connected to the wiring board 30. As shown in FIG. 5, the flexible cables 320 are attached to the back surfaces of the end parts 251a' of the lower part 251a of the backing member 251 and are connected to the liquid crystal cell 210 and the LEDs 244.

The wiring board 30 is not attached to the shell formed by combining the front periphery covering member 40 and the rear panel 50. Therefore, any stress will not be induced in the wiring board 30 even if the front periphery covering member 40 or the rear panel 50 is warped or bent and hence the wiring board 30 will not be damaged by forces exerted on the shell. Since the wiring board 30 is disposed below the liquid crystal module 20, the wiring board 30 is at a short distance from and can be easily connected to the circuit of the main unit 2 of the personal computer 1.

The liquid crystal module 20 and the wiring board 30 are contained in the shell formed by combining the front periphery covering member 40 and the rear panel 50.

Figure 6:
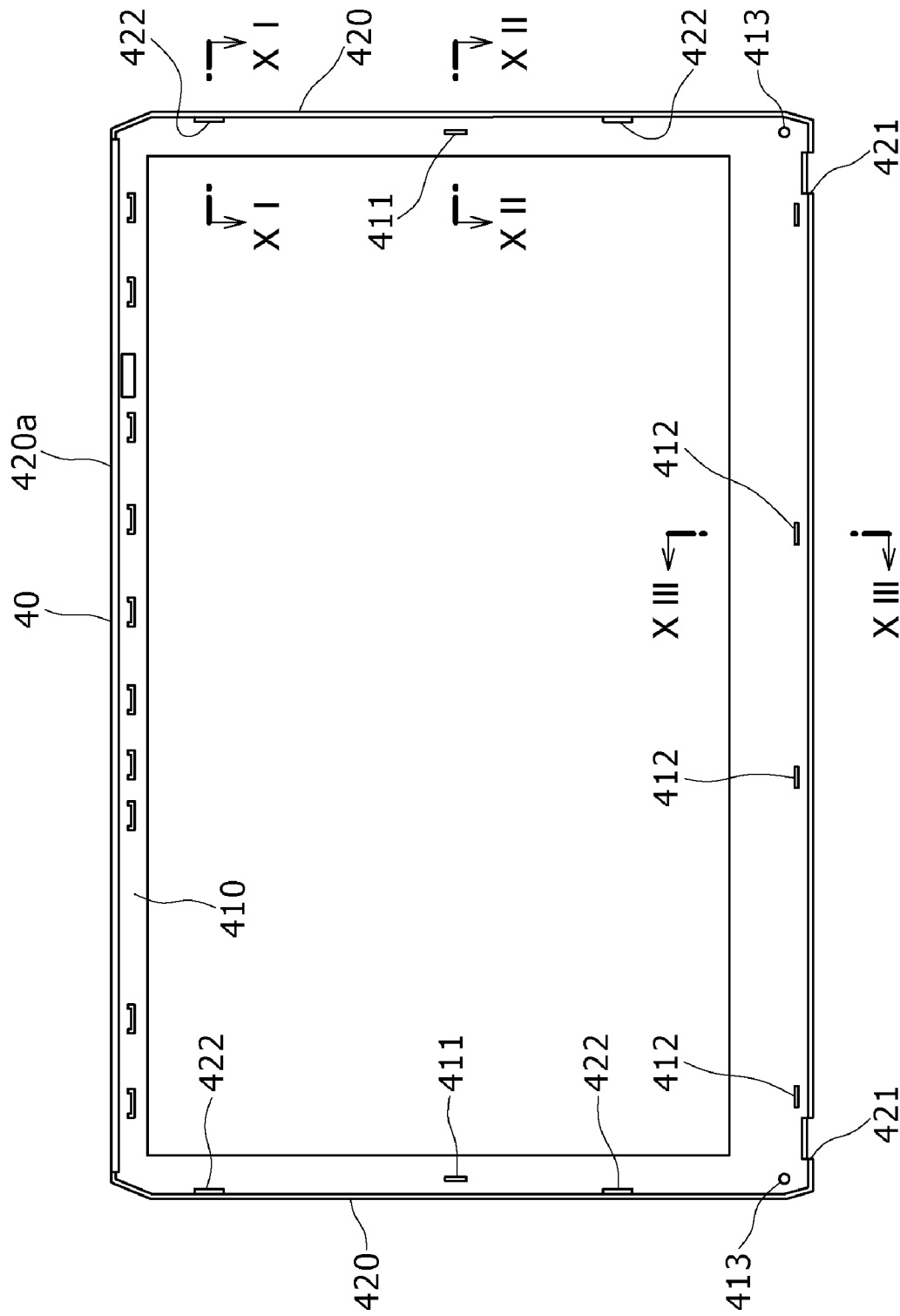
FIG. 6 is a schematic rear view of a front edge covering member.
Figure 14:
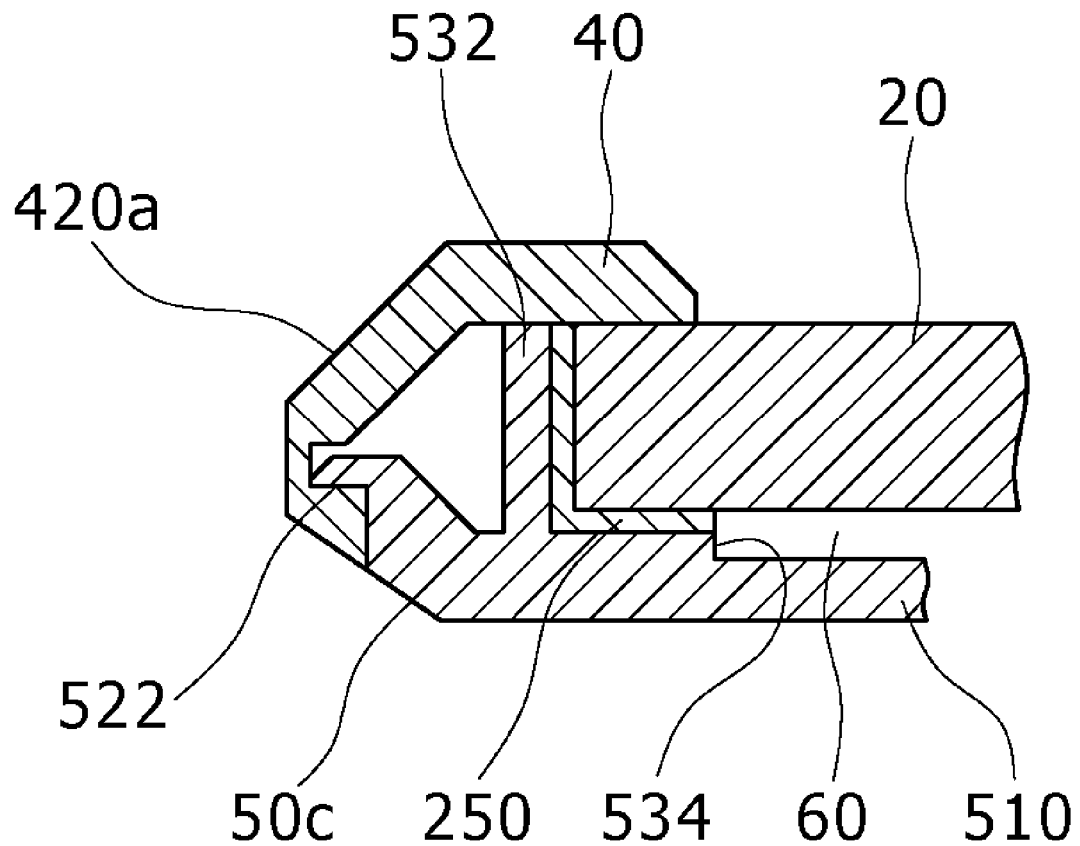
FIG. 14 is an enlarged sectional view taken on the line XIV-XIV in FIG. 7.

The front periphery covering member 40 is made of a synthetic resin. As shown in FIG. 6, the front periphery covering member 40 has front wall 410 resembling a laterally elongate, rectangular frame and a side wall 420 extending backward from the outer edges of the front wall 410. Cuts 421 are formed respectively in opposite end parts of a lower part of the side wall 410. As shown in FIG. 14, the side wall 420 has an upper part 420a having a cross section of a shape resembling a rounded, inverted letter V.

Figure 11:
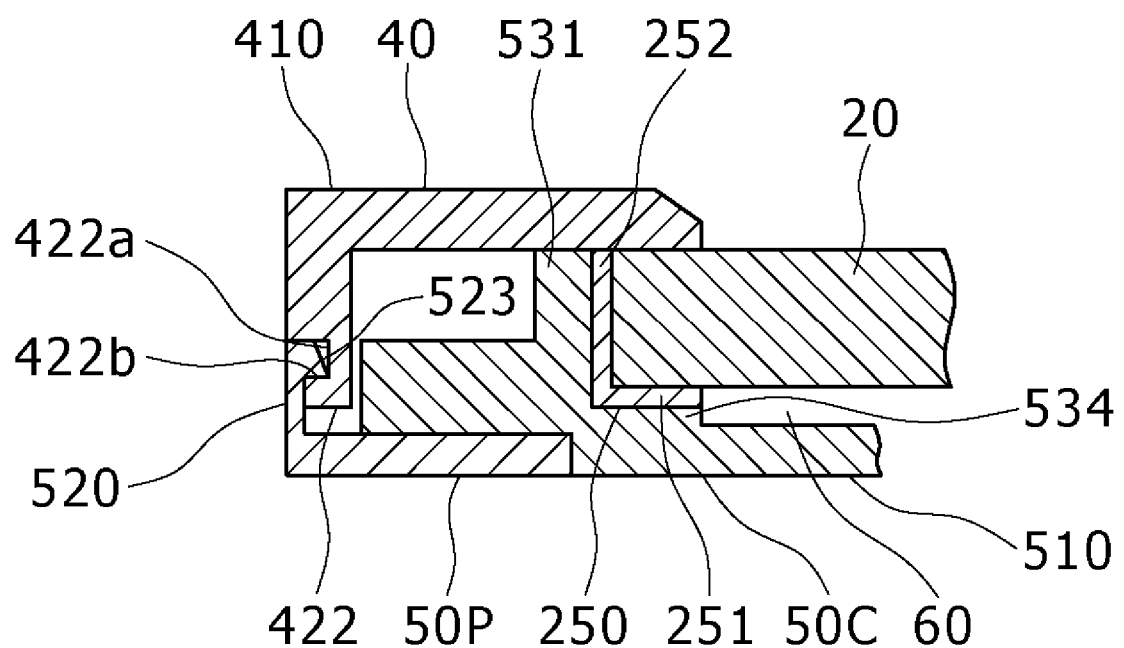
FIG. 11 is an enlarged sectional view taken on the line XI-XI in FIG. 6.

Referring to FIG. 11, side parts of the side wall 420 are provided respectively in parts thereof near the upper and the lower end thereof with fastening projections 422 extending backward along the inner surfaces of the side parts of the side wall 420. Recesses 422a are formed in the outside surfaces of the fastening projections 422 extending backward from the rear ends of the side wall 420. The recesses 422a have rear surfaces serving as retaining surfaces 422b.

Figure 12:
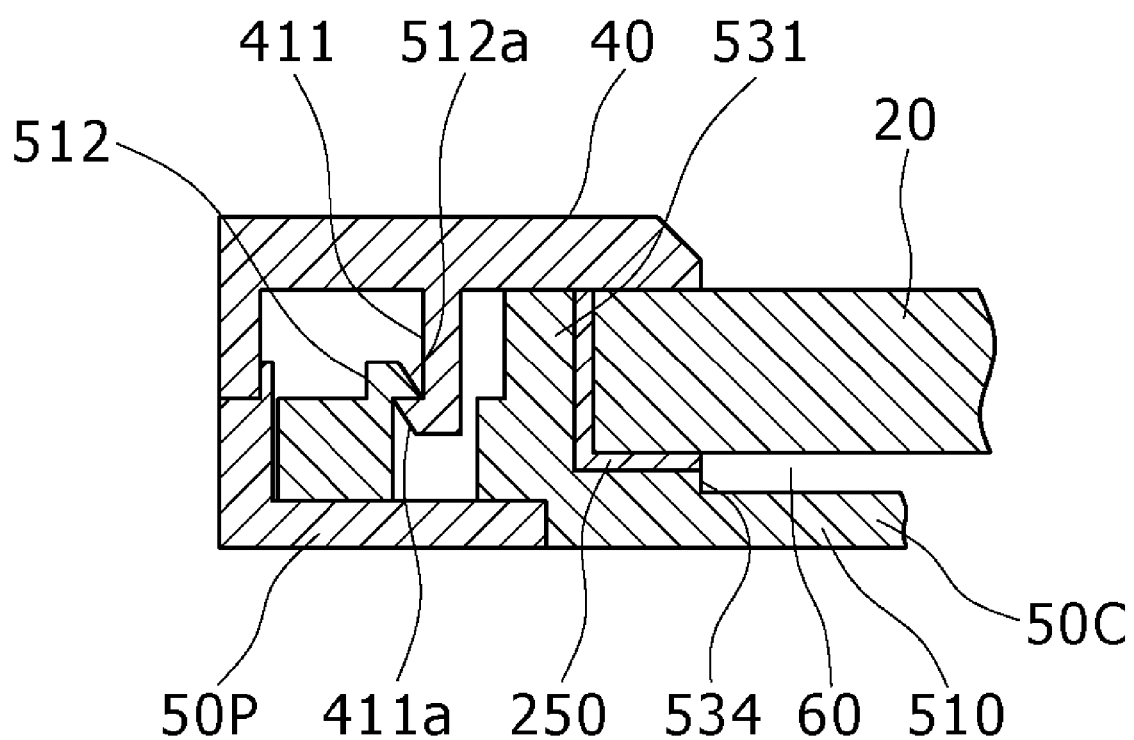
FIG. 12 is an enlarged sectional view taken on the line XII-XII in FIG. 6.
Figure 13:
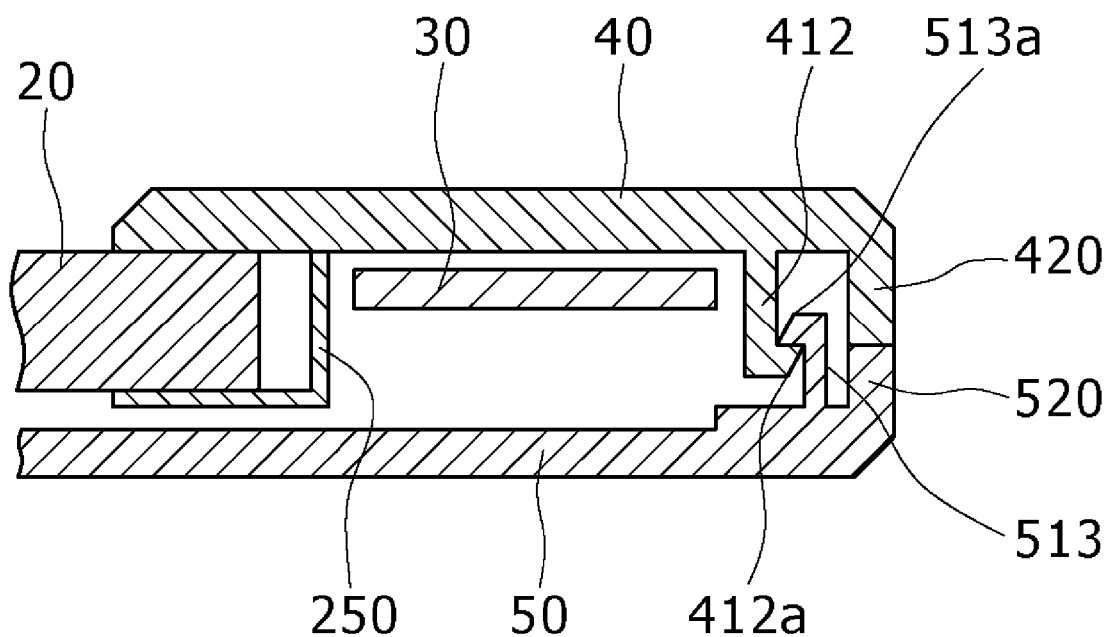
FIG. 13 is an enlarged sectional view taken on the line XIII-XIII in FIG. 6.

As shown in FIG. 12, fastening projections 411 project backward from parts substantially at vertically middle positions, respectively, on the side parts of the front wall 410 spaced slightly inward from the side wall 420. The fastening projections 411 are provided at their rear ends with hooks 411a protruding toward the side wall 420, respectively. As shown in FIG. 13, fastening projections 412 project backward from parts at position on the lower part of the front wall 410 spaced slightly inward from the side wall 420. The fastening projections 412 are provided at their rear ends with hooks 412a protruding toward the side wall 420, respectively.

Through holes 413 are formed near the opposite ends of the lower part of the front wall 410, respectively.

Figure 7:
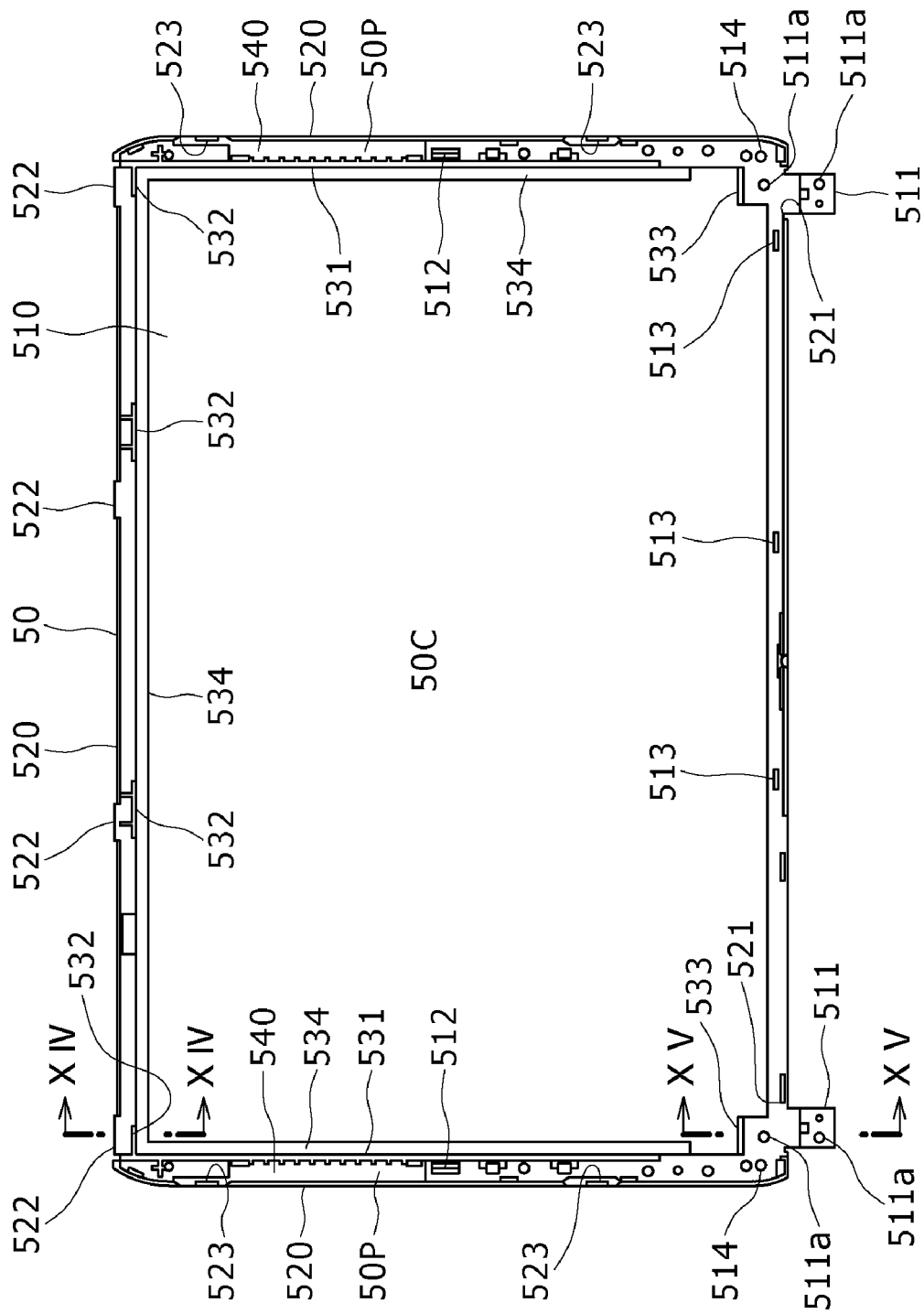
FIG. 7 is a schematic front elevation of a rear panel.
Figure 8:
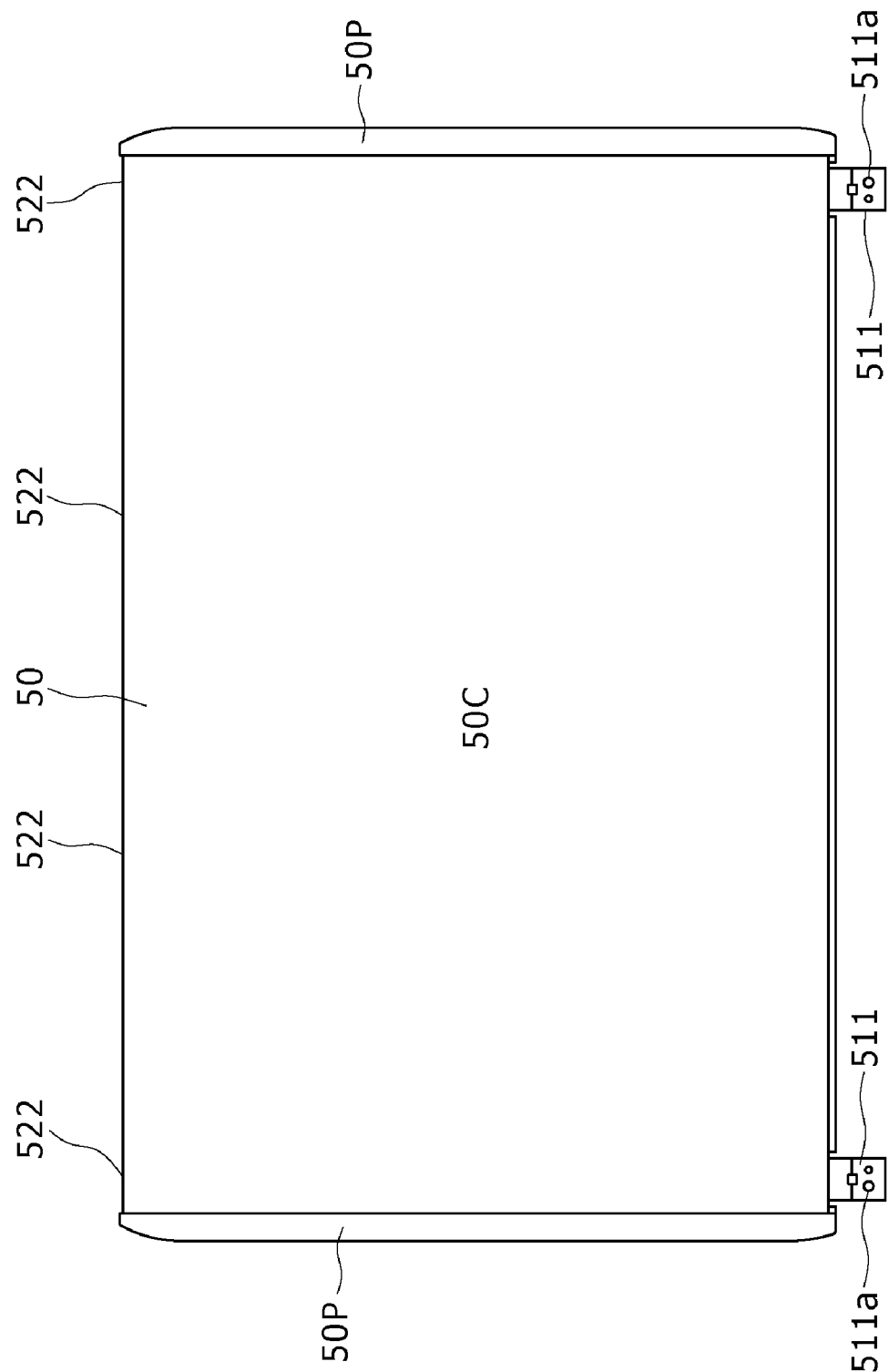
FIG. 8 is a schematic rear view of the rear panel.
Figure 9:
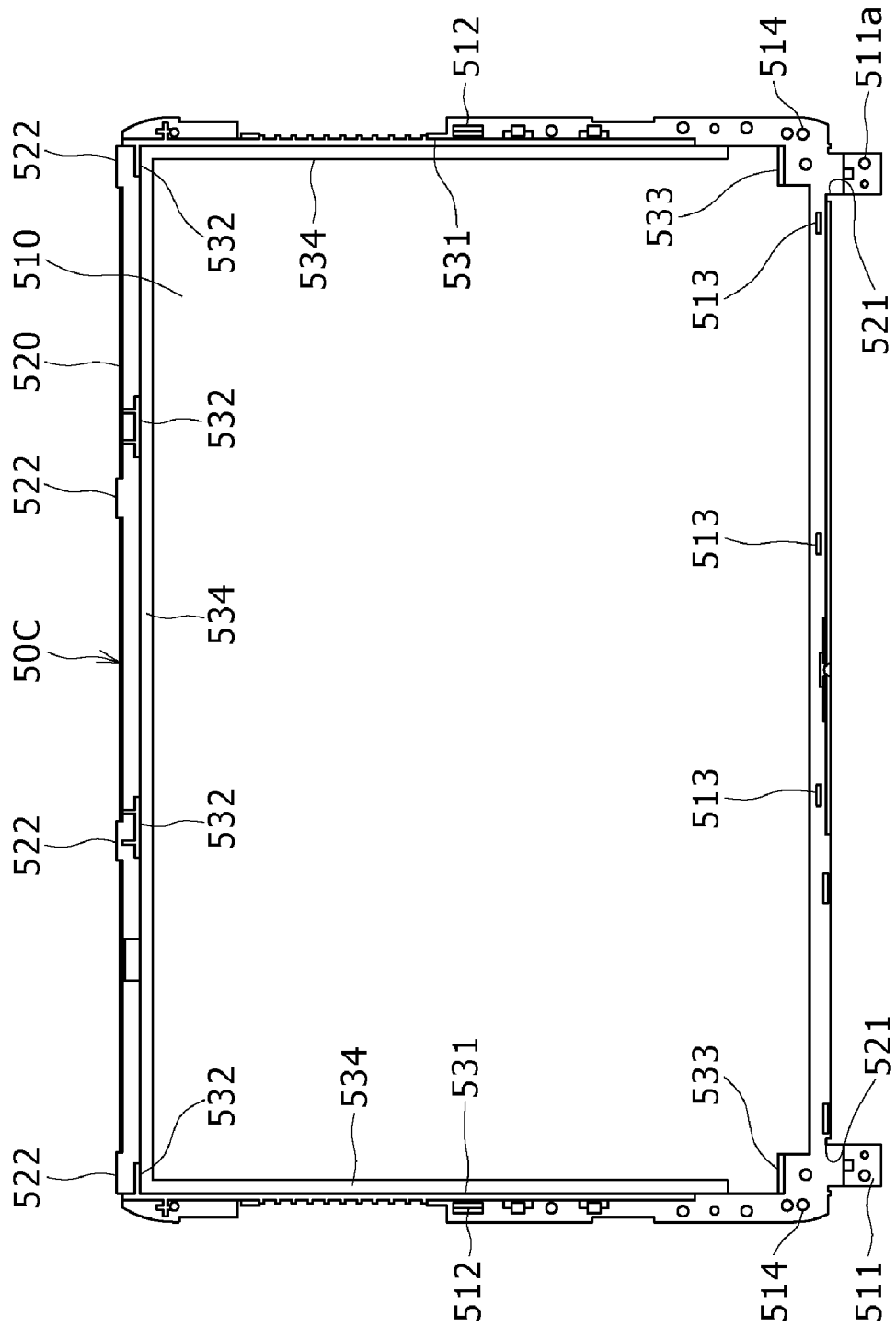
FIG. 9 is a schematic front elevation of a component carbon plate of the rear panel.

Referring to FIGS. 7 to 9, the rear panel 50 has a plate-like back wall 510 having the shape of a rectangular plate substantially the same as the front periphery covering member 40 in outline and size. A side wall 520 extends forward from a peripheral part of the back wall 510 slightly inside the outer edge of the back wall 510. The distance between the side wall 520 and the outer edge of the back wall 510 is approximately equal to the thickness of the side wall 420 of the front periphery covering member 40. Cuts 521 are formed in parts of the lower part of the side wall 520 extending along the lower edge at positions near the opposite ends of the lower part of the side wall 520. Connecting lugs 511 protrude downward from parts of the back wall 520 corresponding to the cuts 521, respectively. The connecting lugs 511 are provided with through holes 511a, respectively.

Partition walls 531 are formed on the front surface of the back wall 510 so as to extend along the substantially entire length of side edges of the back wall 510 slightly inside the side wall 520. Plural partition walls 532 are formed on the front surface of the back wall 510 so at intervals slightly inside the upper part of the side wall 520. Partition walls 533 are formed on lower parts of the front surface of the back wall 510 at positions above and substantially corresponding to the cuts 521, respectively.

Referring to FIGS. 11 and 14, steps 534 of a low height protruding forward from the front surface of the back wall 510 are formed so as to extend over the entire length of the upper edge of the back wall 51 contiguously with the inner surfaces of the partition walls 532 and so as to extend over the entire length of the side edges of the back wall 510 contiguously with the inner surfaces of the partition walls 531.

As shown in FIG. 14, fastening projections 522 are formed on the front end of the outer surface of an upper part of the side wall 520. As shown in FIG. 11, fastening projections 523 protrudes outward from the front ends of the inner surfaces of side parts of the side wall 520 at positions near the upper ends of the side parts of the side wall 520 and at positions slightly below the middles of the side parts of the side wall 520, respectively.

As shown in FIG. 12, fastening projections 512 protrudes forward from substantially middle parts with respect to a vertical direction of right and left side parts of the back wall 510 extending between the side wall 520 and the partition walls 531. Hooks 512a project from the front ends of the fastening projections 512 toward the partition walls 531, respectively. As shown in FIG. 13, fastening projections 513 protrudes forward from parts near the lower edge of the back wall 510 at positions slightly above a lower part of the side wall 520. Hooks 513a project upward from the front ends of the fastening projections 513, respectively.

Antenna pockets 540 are formed in upper parts of vertically elongate spaces defined by the back wall 510, the side wall 520 and the partition walls 531 in right and left side parts of the back wall 510.

Holes 514 to be threaded are formed in parts of the back wall 510 in lower parts of the vertically elongate spaces.

Referring to FIG. 9, major part of the rear panel 50 is a carbon fiber reinforced plastic plate formed by impregnating a carbon fabric with a resin, such as an epoxy rein or an acrylic resin, and small right and left side parts of the rear panel 50 are formed of a synthetic resin. More specifically, in FIG. 8, vertically elongate, right and left side parts 50P are made of a synthetic resin and a major part 50C extending between the right and the left side part 50P is a carbon fiber reinforced plastic plate. In FIG. 7 showing the rear panel 50 in a front elevation, right and left side parts of the side wall 520 and short parts 520(P) laterally extending from the upper and the lower ends of the right and the left side part of the side wall 520 are made of a synthetic resin, parts defining the antenna pockets 540 are made of a synthetic resin.

The rear panel 50 having the major part formed of the carbon fiber reinforced plastic plate is lightweight and has a high strength.

The liquid crystal module 20 and the wiring board 30 are combined with and held by the front periphery covering member 40 and the rear panel 50 in the following manner.

Figure 10:
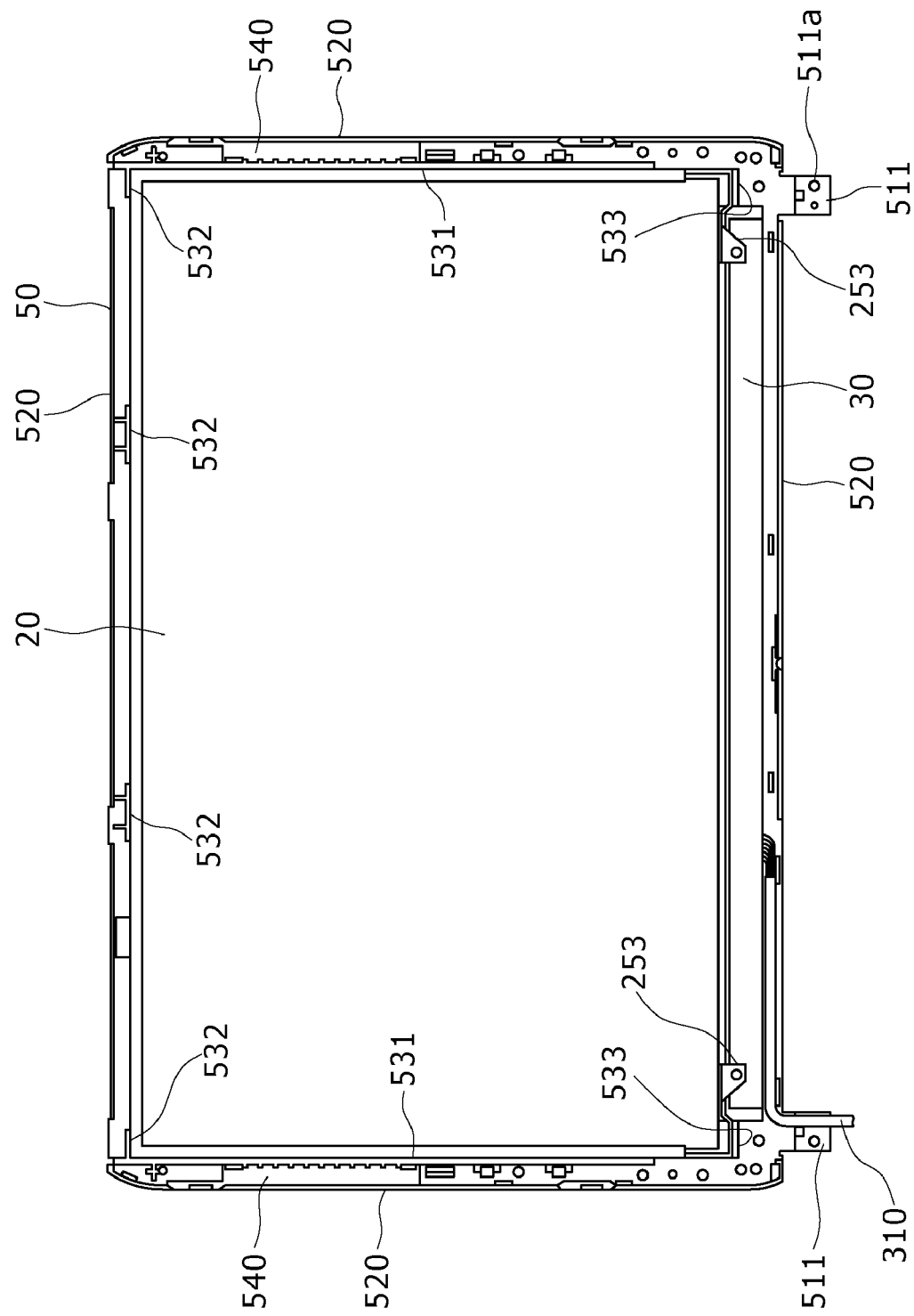
FIG. 10 is a schematic front elevation of an assembly of the rear panel, the liquid crystal module and the wiring board.

FIG. 10 shows the liquid crystal module 20 and the wiring board 30 mounted on the front surface of the rear panel 50. The partition walls 532, the partition walls 531 and the partition walls 533 are in contact with the upper edge, the right and the left edge, and the opposite end parts of the lower edge of the liquid crystal module 20, respectively, as shown in FIGS. 11 and 14 to position the liquid crystal module 20 on the rear panel 50. Thus the partition walls 532, 531 and 533 are positioning members in contact with at least four corner parts of the liquid crystal module 20 to position the liquid crystal module 20 on the rear panel 50 and to restrain the liquid crystal module 20 from movement in a plane. The backing member 251 of the holding frame 250 of the liquid crystal module 20 is in contact with the front surface of the step 534 of the rear panel 50 as shown in FIGS. 11 and 14. The backing member 251 of the holding frame 250 serves also as a spacer to form a space 60 between the reflecting panel 240 and the back wall 510 of the rear panel 50. The space 60 has a thickness equal to the sum of the height of the step 534 from the inner surface of the back wall 510 and the thickness of the backing member 251. Exertion of pressure through the reflecting panel 240 on the liquid crystal cell 210 by the back wall 510 of the rear panel 50 can be avoided even if the rear panel 50 is warped or bent by the agency of the space 60.

In a state where the liquid crystal module 20 is mounted on the rear panel 50, the wiring board holding lugs 253 of the holding frame 250 project downward through the cuts 521 formed in the lower part of the side wall 520 of the rear panel 50. Thus the wiring board 30 is disposed in a space extending between the lower partition walls 533 formed on the back wall 510 of the rear panel 50 and the lower part of the side wall 520 of the rear panel 50. The wiring harness 310 for connecting circuits formed on the wiring board 30 to circuits arranged in the main case 4 of the personal computer 1 is extended in a space extending along the wiring board 30 and the lower part of the side wall 20 and is extended outside from the display unit 10 through one of the cuts 521 formed in the lower part of the side wall 520.

The liquid crystal module 20 and the wiring board 30 are mounted on the rear panel 50 as mentioned above, and then the front periphery covering member 40 is joined to the rear panel 50. The front periphery covering member 40 is on the front side of the rear panel 50. Then, the back, inner edge of the upper part 420a of the front periphery covering member 40 extending along the upper edge of the side wall 420 of the front periphery covering member 40 is engaged with the fastening projections 522 formed along the outer surface of the upper part of the side wall 520 as shown in FIG. 14, the fastening projections 522 formed on the inner surfaces of the right and the left side parts of the side wall 520 of the rear panel 50 are engaged with the retaining surfaces 422b of the fastening projections 422 extending along the side parts of the side wall 420 of the front periphery covering member 40 as shown in FIG. 11, the hooks 411a of the fastening projections 411 formed on the right and the left parts of the front periphery covering member 40 are engaged with the hooks 512a of the fastening projections 512 formed on the right and the left side part of the rear panel 50 as shown in FIG. 12, and the hooks 412a of the fastening projections 412 formed on the lower edge of the front periphery covering member 40 are engaged with the hooks 513a of the fastening projections 513 formed on the lower edge of the rear panel 50 as shown in FIG. 13 to fasten together the front periphery covering member 40 and the rear panel 50. Screws 430 are passed through the holes 413 formed near the opposite ends of the lower part of the front periphery covering member 40 and are screwed into the holes 514 to be threaded formed in the lower parts of the right and the left side parts of the rear panel 50. Thus a peripheral part of the liquid crystal module 20 is held between the front periphery covering member 40 and the rear panel 50. The cuts 421 formed respectively in opposite end parts of the lower part of the side wall 410 of the front periphery covering member 40 and the cuts 521 formed in opposite end parts of the lower part of the side wall 520 of the rear panel 50 coincide with each other, respectively, to define openings through which the wiring board holding lugs 253 of the holding frame 250 are passed.

Figure 15:
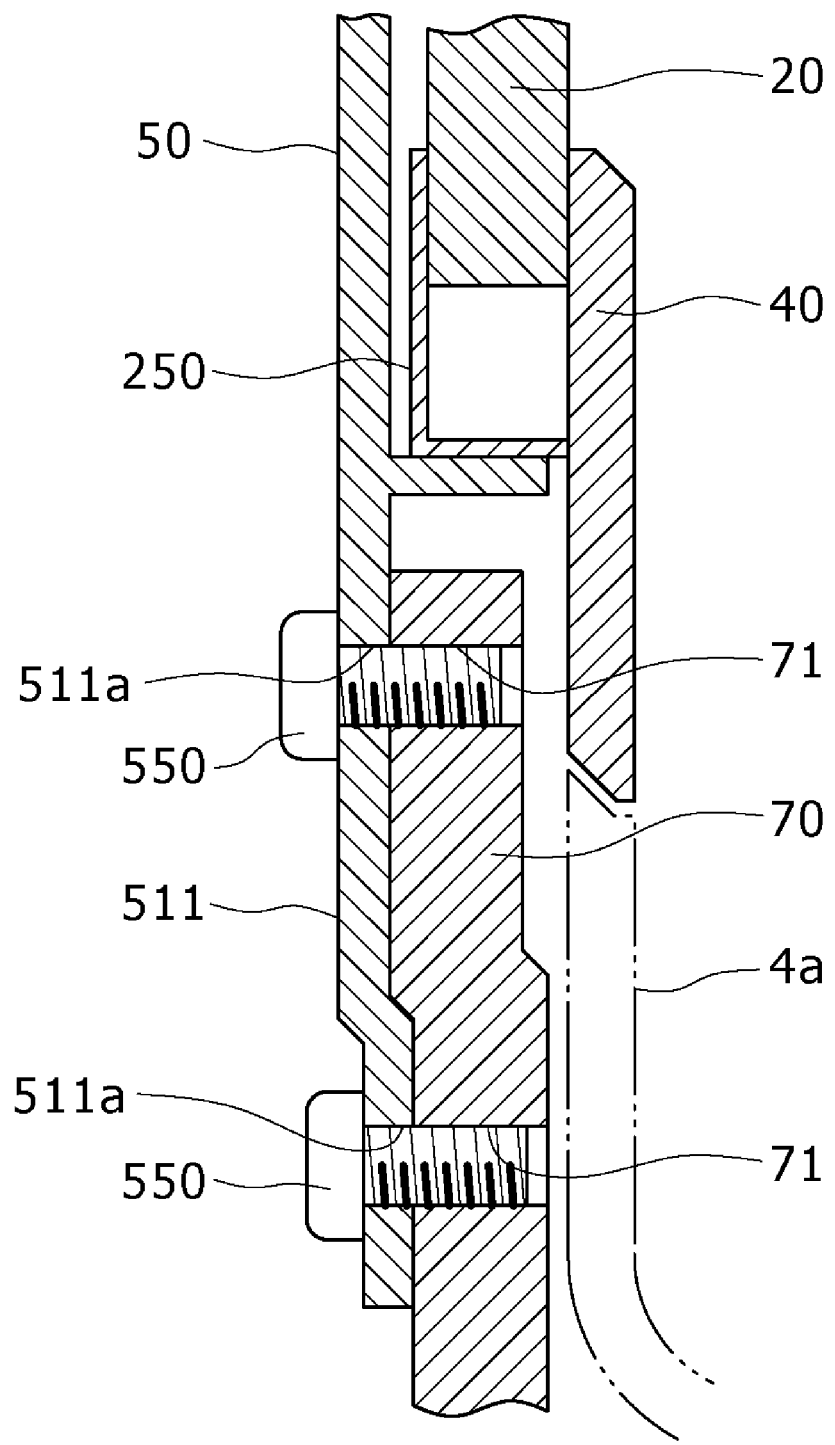
FIG. 15 is an enlarged sectional view taken on the line XV-XV in FIG. 7.

The display unit 10 is connected to the main unit 2 of the personal computer 1 so as to be able to turn relative to the main unit 2. As shown in FIG. 15, connecting members 70, namely, component members of hinges, not shown, are placed on the front surfaces of the connecting members 511 of the rear panel 50, respectively, screws 550 inserted through the through holes 511a formed in the connecting members 511 from the rear side are screwed into threaded holes 71 formed in the connecting members 70 to connect the display unit 10 to the main unit 2 of the personal computer 1 so as to be able to turn relative to the main unit 2 of the personal computer 1. The front surfaces of the connecting members 70 are covered partly with a part 4a of the main case 4. A space capable of holding the heads of the screws 550 is needed between the rear panel 50 and a covering member covering the front surface of the rear panel 50 if the screws 550 are screwed into the threaded holes from the side of the covering member and the space increases the thickness of the display unit. When the screws 550 thus inserted through the through holes 511a formed in the connecting members 511 from the rear side are screwed into the threaded holes 71 formed in the connecting members 70, any space for holding the heads of the screws 550 is not necessary and the display unit 10 can be formed in a small thickness.

As apparent from the foregoing description, in the embodiment according to the present invention, the wiring board and the wiring harness do not need to be disposed between the liquid crystal module 20 and the rear panel 50. Consequently, the liquid crystal module 20 and the rear panel 50 can be combined such that a space of a very small thickness is left between the liquid crystal module 20 and the rear panel 50, and, consequently, the display unit 10 can be formed in a small thickness.

There is nothing that transmits the deformation of the rear panel 50 to the liquid crystal module 20 between the liquid crystal module 20 and the rear panel 50. Therefore, pressure will not be exerted on the liquid crystal cell 210 of the liquid crystal module 20 even if the rear panel 50 is warped or bent, and hence the life of the liquid crystal module 20 can be extended.

Although the display unit of the present invention has been described as used in combination with a personal computer, the display unit of the present invention can be used in combination with devices other than the personal computer.

The shapes and construction of the component parts of the foregoing embodiment are only examples and it is therefore to be construed that the technical scope of the present invention is not limited by the embodiment specifically described herein.

It should be understood by those skilled in the art that various modifications, combinations, sub-combinations and alterations may occur depending on design requirements and other factors insofar as they are within the scope of the appended claims or the equivalents thereof.

What is claimed is:

1. A display unit comprising:
   a liquid crystal module;
   a rear panel covering a back surface of the liquid crystal module;
   a front periphery covering member covering a peripheral part of a front surface of the liquid crystal module; and
   a wiring board, including a drive circuit for driving the liquid crystal module, adjacent to a portion of the liquid crystal module, the wiring board being in-between the rear panel and the front periphery covering member, said wiring board configured for driving the liquid crystal module,
   wherein,
   the liquid crystal module includes, (a) a liquid crystal cell, (b) a light guide panel disposed behind a back surface of the liquid crystal cell, (c) a reflecting panel disposed behind a back surface of the light guide panel, and (d) a plurality of LEDs disposed opposite to one end surface of the light guide panel, and
   the LEDs and the wiring board are arranged on the same side of the light guide and in substantially the same plane.

2. The display unit according to claim 1, wherein:
   the display unit further comprises a step, which protrudes forward from at least a portion of the front surface of a back wall,
   at least a portion of the spacing part of the holding frame of the liquid crystal module is in contact with the step, and
   a space of a thickness equal to the sum of the height of the step from the back wall and the thickness of the spacing part of the holding frame is between the reflecting panel of the liquid crystal module and the back wall of the rear panel.

3. The display unit according to claim 1, wherein:
   the display unit further comprises positioning walls in contact with at least a part of each corner of the liquid crystal module, the positioning walls effective to position the liquid crystal module with respect to directions in a plane,
   the positioning walls are formed at least in parts of each corner of the back wall of the rear panel, and
   the wiring board is attached to the holding frame.

4. The display unit according to claim 1, wherein a wiring harness for connecting the wiring board to an external device extends beside the liquid crystal module.

5. The display unit according to claim 1, wherein connecting members formed in the rear panel are fastened to component members of hinges disposed in front of the connecting members by passing screws through holes formed in the connecting members from the rear side and screwing the screws into threaded holes formed in the component members of the hinges.

6. The display unit according to claim 1, wherein the LEDs are disposed on a part of the reflecting panel.

7. A data processing system equipped with a display unit, the display unit comprising:
   a liquid crystal module;
   a rear panel covering the back surface of the liquid crystal module;
   a front periphery covering member covering a peripheral part of the front surface of the liquid crystal module; and a wiring board, including a drive circuit for driving the liquid crystal module, adjacent to a portion of the liquid crystal module, the wiring board being in-between the rear panel and the front periphery covering member said wiring board configured for driving the liquid crystal module, wherein, the liquid crystal module includes, (a) a liquid crystal cell, (b) a reflecting panel disposed behind the back surface of the light guide panel, and (c) a plurality of LEDs disposed opposite to one end surface of the light guide panel, and the LEDs and the wiring board are arranged on the same side as the light guide and in substantially in the same plane.

* * * * *